March 25, 1947.     M. W. HUBER     2,417,873
ACCUMULATOR
Filed May 12, 1944
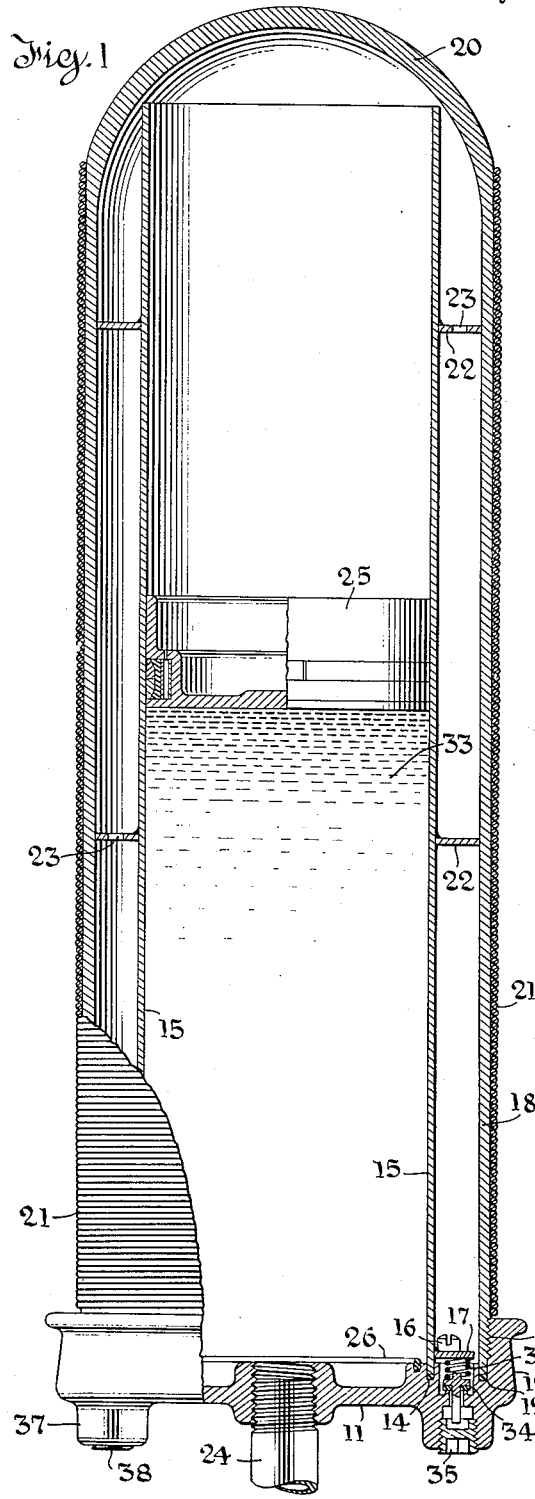
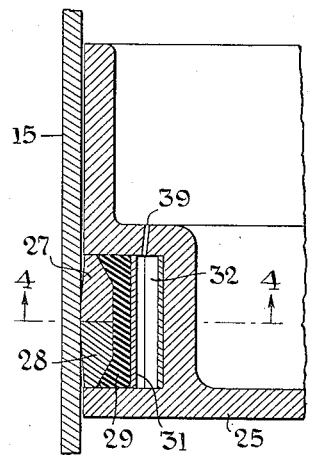
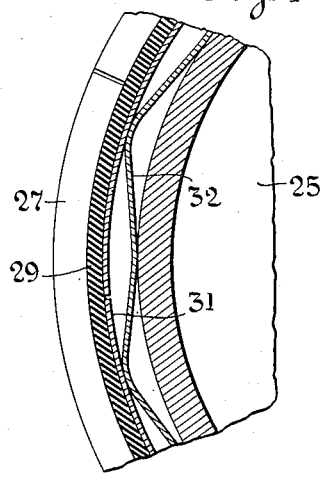
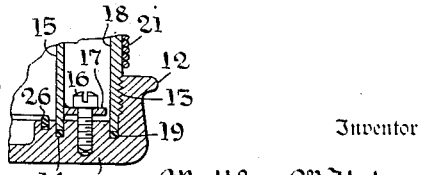
Inventor
Matthew W. Huber
By Dodge
Attorneys Patented Mar. 25, 1947

2,417,873

UNITED STATES PATENT OFFICE 2,417,873

ACCUMULATOR

Matthew W. Huber, Watertown, N. Y., assignor to The New York Air Brake Company, a corporation of New Jersey Application May 12, 1944, Serial No. 535,350

7 Claims. (Cl. 138—31)

1

This invention relates to hydraulic accumulators of the type in which a cushion of compressed gas is separated from the hydraulic liquid by a floating piston.

The object of the invention is to produce a strong, lightweight accumulator, which can be charged to high pressures. An important feature is a shell which has the necessary tensile strength but will not split if punctured by a bullet.

The preferred embodiment is illustrated in the accompanying drawings, in which:

Figure 1 is a view of the accumulator chiefly in axial section but partly in elevation.

Figure 2 is a section of the marginal portion of the base taken on a different radial plane from the plane of section in Figure 1.

Figure 3 is an enlarged fragmentary axial section through a portion of the piston and its guide sleeve.

Figure 4 is a section on the line 4—4 of Figure 3.

The accumulator is of generally cylindrical form and is carried by a peripherally flanged base 11, the peripheral flange 12 being internally threaded at 13. Spaced a short distance inward from flange 12 is a groove which receives the rubberlike gasket 14 of oilproof plastic.

Fitting in the groove and seated on gasket 14 is the lower end of the piston guiding sleeve 15. This is held by a circumferential series of screws 16 which are inserted through holes in an encircling flange 17 welded to sleeve 15, and are threaded into base 11. The sealed joint so formed is never subjected to a heavy fluid pressure differential in the operation of the accumulator.

Screwed into threads 13 is the lower end of the accumulator shell 18. The lower margin of the shell enters and fits closely in an annular groove formed in base 11 to receive it, and seats on an annular gasket 19 confined in the groove. The shell 18 is cylindrical with a hemispherical upper end, so that it is stable under internal pressures. The gasket 19 seals against the fluid pressure developed within the accumulator so that threads 13 are at atmospheric pressure. Thus the effect of pressure is to expand the lower margin of the shell in threads 13 and produce a tight locked joint.

The shell 18 is formed of soft steel, not heat treated, so that it will not split if punctured by a projectile. The shell 18 is formed in one piece with a hemispherical head whose walls are twice or a little more than twice the thickness of the cylindrical walls. The cylindrical portion of the shell is sheathed with piano wire 21 which is wound under controlled tension and is sweated in place, preferably as it is wound.

This gives a shell structure which will resist the internal pressure loading to which it is to be subjected.

Since the strength of a sphere is approximately twice the strength of a cylinder of the same diameter and of the same wall thickness, the hemispherical head has a strength four or more times that of the cylindrical portion of the shell without the wire winding. Piano wire winding has a tensile strength of the order of five times that of the soft steel, and by winding the shell as described it is possible to arrive at a structure in which the piano wire and the shell reach their tensile elastic limits at about the same loads. The effect is to produce a receptacle having a maximum strength for its weight.

The piston guiding sleeve 15 extends nearly to the upper end of the shell 18 and is spaced therefrom by rings 22, two of which are shown as encircling and welded to the sleeve 15. These rings have apertures 23 so that they do not prevent gas-flow in the interval between the sleeve and shell.

The sleeve 15 is never subject to a large fluid pressure differential for the differential is never greater than that necessary to overcome the friction of the piston hereinafter described. Hence the sleeve can be made quite thin. It must, however, have an accurate bore, and an important function of rings 22 is to hold the sleeve in its true circular form. Two rings are usually sufficient, but more can be used. It is desirable to apply them before the bore of the sleeve is machined or otherwise finished.

The main system connection to the accumulator is by way of pipe 24 which is threaded into the base 11 at the center. A central location is not essential but the connection must be to the space within sleeve 15.

Slidable in sleeve 15 is the cup-shaped piston 25. In its lowermost position the piston seats upon a soft plastic sealing ring 26 of say an oil resisting synthetic similar to rubber, mounted in a groove in the base 11 as shown. The piston is long enough to maintain its own alinement and carries a pair of expansible sealing rings 27, 28 of metal (bronze is commonly used).

The rings 27 and 28 are identical, but are reversely set and so placed that their gaps are displaced 180°. The gaps may have any of the known ring joints (not illustrated). Each ring contacts the sleeve 15 on a narrow cylindrical area near the plane of contact of the rings with each other. The ring 27, above its cylindrical contact area and the ring 28 below its cylindrical contact area, are each slightly tapered, the angle of taper being exaggerated in the drawing to make it clearly visible. The plane contacting surfaces of the two rings are lapped; and the rings precisely but freely fit the groove in the piston. The inner cylindric surfaces of the rings 27 are respectively beveled top and bottom, as shown (see Fig. 3).

Behind the rings is an annulus 29 of rubber-like plastic, which is sustained by a thin split ring 31. Ring 31 is urged outward by a polygonal expander 32 of spring metal. The annulus 29 is continuous and formed externally to fit the interior of the two metal rings. It functions to crowd the two metal rings outward and into contact with each other, while sealing both rings off from the bottom of the groove. The bottom of the groove is subject to the gas pressure above the piston admitted by drilled port 39.

Oil from the system enters through pipe 24 and fills the space below the piston as indicated at 33. Displacement of the piston is resisted by a charge of gas under pressure, commonly nitrogen, confined to the interior of the guide sleeve 15 above piston 25 and the encircling space between sleeve 15 and shell 18.

The gas charge is introduced through check valve 34 after removing plug 35. The valve 34 is seated by a spring 36 which reacts against flange 17. The nipple 37 is for the attachment of a gage and is shown plugged at 38.

The purpose of the piston is to prevent gas from mixing with or becoming occluded in the oil. If this result is to be effected over a considerable period of time, particularly in cases where the gas charge is under heavy pressure, it is important that the piston seal tightly. The construction above described accomplishes the desired result because the piston rings have a narrow area of contact with the sleeve 15, are subject to balanced or approximately balanced pressures, and are sealed off from the bottom of the groove by the continuous plastic ring 29. In consequence the unit pressures developed by the rings against the sleeve 15 are adequate and subject only to moderate variation. Because the gas space within the shell 18 completely encircles the sleeve 15, the sleeve is always subject to pressures which are approximately equal. The only pressure differential which can be developed is that necessary to overcome the friction of the piston 25. Because of this balanced pressure condition it is possible to construct the shell 15 of a light alloy and to make it quite thin. Because of its thinness and the need for preserving its true cylindrical form, the use of the encircling rings 22 is desirable.

When the liquid charge in the accumulator has been withdrawn, it is important that the piston shall seal to the base 11 and thus prevent the escape of any of the gas charge past the piston, it being remembered that the piston rings are not designed to seal against a heavy pressure differential but on the contrary are designed to afford a free moving piston with a precise seal against moderate pressures. Consequently the use of a soft sealing ring 26 which will assure a perfect seal is an important detail.

The design permits the formation of the entire receiver as a long slender cylinder which can readily be located in any corner so as to take up little otherwise useful space. The accumulator was designed particularly for use in airplanes, and the wire wound construction used for the shell 18 greatly reduces the danger of injury to personnel if the shell is punctured as it may be, particularly in combat planes.

While the illustrated embodiment involves details of form and arrangement which are considered desirable, certain of these features are subject to modification within the scope of the invention and for that reason the illustrated embodiment should be considered as exemplary and not limiting.

What is claimed is:

1. In a hydraulic accumulator of the gas-cushion type, the combination of a base; a cylindrical shell closed at one end and sealed to said base at the other end by means of a threaded joint; a cylindrical sleeve shorter than the shell mounted coaxially within said shell, said sleeve being surrounded by a gas-filled space within the shell; means serving to connect and seal one end of the sleeve to said base, said means comprising a gasket engaged by the sleeve and a series of threaded connectors arranged circumferentially of the sleeve and engaging the sleeve and base; centering and reinforcing means for said sleeve comprising at least one ported encircling spacer ring extending across the gas-filled space between the sleeve and the shell; a piston slidable in said sleeve; and a liquid connection in said base leading to the space within said sleeve.

2. In a hydraulic accumulator of the gas-filled type, the combination of a base; a generally cylindrical shell sealed to the base; a smaller cylindrical sleeve within the shell and also sealed to the base; a liquid connection leading through the base to the space within the sleeve; a piston slidable in the sleeve; and sealing means for said piston comprising a pair of adjacent expansible piston rings, a resilient backing for said rings and elastic expanding means reacting outward upon said resilient backing.

3. In a hydraulic accumulator of the gas cushion type, the combination of a base having an upstanding internally threaded flange and an annular groove at the root of said flange; a resilient annular gasket confined in said groove; a cylindrical shell, closed at its upper end and threaded near its lower end in said flange, the extreme lower end entering said groove and seating on said gasket; a slender sleeve sealed at its lower end to said base within said shell and spaced therefrom to define an intervening gas filled space in communication with the upper end of said sleeve; a connection for charging said space with gas under pressure; a pressure liquid connection leading through said base to the interior of said sleeve; a piston slidable in said sleeve and having a ring groove in communication substantially at its bottom with the gas filled space; and sealing means in said groove comprising at least one split metallic ring which engages the sleeve, an underlying rubberlike ring which seals said metallic ring from the bottom of the groove, and yielding means for developing an expanding stress on said rings.

4. In a hydraulic accumulator of the gas-filled type, the combination of a base; a generally cylindrical shell sealed to the base; a smaller cylindrical sleeve within the shell and also sealed to the base; a liquid connection leading through the base to the space within the sleeve; means for charging the space between the shell and sleeve with gas under pressure; a piston slidable in the sleeve and having a ring groove in communication at its bottom with the gas filled space above the piston; and sealing means in said ring groove comprising a pair of expansible metallic piston rings, an underlying ring of rubberlike material which seals said rings from the bottom of the ring groove, and expanding means acting outward on said underlying ring.

5. In a hydraulic accumulator of the gas-filled type, the combination of a base; a generally cylindrical shell sealed to the base; a smaller cylindrical sleeve within the shell and also sealed to the base; a liquid connection leading through the base to the space within the sleeve; means for charging the space between the shell and sleeve with gas under pressure; a piston slidable in the sleeve and having a ring groove in communication at its bottom with the gas filled space above the piston; and sealing means in said ring groove comprising a pair of expansible metallic piston rings having reversely tapered sleeve-engaging peripheries, an underlying ring of rubberlike material which seals said rings from the bottom of the ring groove, and expanding means acting outward on said underlying ring.

6. In a hydraulic accumulator of the gas-filled type, the combination of a base; a generally cylindrical shell sealed to the base; a smaller cylindrical sleeve within the shell and also sealed to the base; a liquid connection leading through the base to the space within the sleeve; means for charging the space between the shell and sleeve with gas under pressure; a piston slidable in the sleeve and having a ring groove in communication at its bottom with the gas filled space above the piston; and sealing means in said ring groove comprising a pair of expansible metallic piston rings having reversely beveled internal surfaces, an underlying ring of rubberlike material which seals said rings from the bottom of the ring groove and by engaging the beveled internal surfaces of the rings urges them together, and expanding means acting outward on said underlying ring.

7. In a hydraulic accumulator of the gas-filled type, the combination of a base; a generally cylindrical shell sealed to the base; a smaller cylindrical sleeve within the shell and also sealed to the base, said sleeve having apertured encircling flanges dimensioned to center the sleeve within the shell and to maintain accurately the cylindrical form of the sleeve; a liquid connection leading through the base to the space within the sleeve; and a piston slidable in the sleeve.

MATTHEW W. HUBER.

REFERENCES CITED

The following references are of record in the file of this patent:

UNITED STATES PATENTS

| Number | Name | Date |
|---|---|---|
| 2,352,041 | Van den Berg | June 20, 1944 |
| 2,341,501 | Greenwell et el. | Feb. 8, 1944 |
| 1,959,640 | Peters | May 22, 1934 |
| 2,170,890 | Allen | Aug. 29, 1939 |
| 586,179 | Hamlin | July 13, 1897 |
| 788,769 | Harsen | May 2, 1905 |